United States Patent
Arai et al.

(10) Patent No.: US 8,282,867 B2
(45) Date of Patent: Oct. 9, 2012

(54) INSERT MOLDING DIE, INSERT MOLDING APPARATUS AND INSERT MOLDING METHOD

(75) Inventors: Tsuyoshi Arai, Nagoya (JP); Masayuki Furuhashi, Kariya (JP); Sayaka Okabe, Kariya (JP)

(73) Assignee: Denso Corporation, Kariya (JP)

( * ) Notice: Subject to any disclaimer, the term of this patent is extended or adjusted under 35 U.S.C. 154(b) by 372 days.

(21) Appl. No.: 12/379,836

(22) Filed: Mar. 3, 2009

(65) Prior Publication Data

US 2009/0267256 A1 Oct. 29, 2009

(30) Foreign Application Priority Data

Apr. 25, 2008 (JP) ................................ 2008-116241

(51) Int. Cl.
*B29C 47/00* (2006.01)
(52) U.S. Cl. ................................................. 264/279.1
(58) Field of Classification Search ............... 264/279.1; 425/450.1, 451.9; 249/162
See application file for complete search history.

(56) References Cited

U.S. PATENT DOCUMENTS

| | | | |
|---|---|---|---|
| 6,063,321 A | 5/2000 | Koyama et al. | |
| 6,309,579 B1 | 10/2001 | Koyama et al. | |
| 6,381,926 B1* | 5/2002 | Weiler et al. | ..................... 53/452 |
| 6,692,686 B1 | 2/2004 | Gonda et al. | |
| 2002/0017732 A1 | 2/2002 | Koyama et al. | |
| 2002/0058122 A1 | 5/2002 | Arai et al. | |
| 2005/0035489 A1 | 2/2005 | Arai et al. | |
| 2006/0192323 A1* | 8/2006 | Zobl et al. | ..................... 264/618 |
| 2008/0179792 A1* | 7/2008 | Kurimoto et al. | .......... 264/328.1 |

FOREIGN PATENT DOCUMENTS

| | | |
|---|---|---|
| JP | B2-49-13499 | 4/1974 |
| JP | A-55-025380 | 2/1980 |
| JP | B2-60-094325 | 5/1985 |
| JP | A-09-38982 | 2/1997 |
| JP | A-2001-334567 | 12/2001 |
| JP | A-2002-200643 | 7/2002 |
| JP | A-2004-249556 | 2/2005 |

OTHER PUBLICATIONS

Office Action dated Nov. 26, 2010 from Japan Patent Office in corresponding JP Patent Application No. 2008-116241 (and English translation).
Office Action mailed Feb. 2, 2010 from Japan Patent Office in corresponding JP Patent Application No. 2008-116241 (and English translation).

* cited by examiner

*Primary Examiner* — Joseph Del Sole
*Assistant Examiner* — Kimberly A Stewart
(74) *Attorney, Agent, or Firm* — Posz Law Group, PLC

(57) ABSTRACT

An insert molding die, an insert molding apparatus and an insert molding method are disclosed, wherein a pair of dies 10*a*, 10*b* are arranged in a manner capable of clamping, from axis X side, an insert part 2 arranged along axis X to be insert molded. The dies 10*a*, 10*b* include first separated dies 10*a*1, 10*b*1, second separated dies 10*a*2, 10*b*2 and third separated dies 10*a*3, 10*b*3 adapted to perform the clamp operation independently of each other.

4 Claims, 13 Drawing Sheets

PRIOR ART

PRIOR ART

PRIOR ART

PRIOR ART

INSERT MOLDING DIE, INSERT MOLDING APPARATUS AND INSERT MOLDING METHOD

BACKGROUND OF THE INVENTION

1. Technical field of the Invention

This invention relates to an insert molding die, an insert molding apparatus and an insert molding method.

2. Description of the Related Art

A sensor, a valve part, etc., are conventionally produced by covering a functional part requiring waterproofness such as an IC or an electric coil with a resin housing by injection molding and giving the waterproofness to the resin housing by use of the welding technique or the like.

On the other hand, a method is available in which an IC or an electric coil is inserted and covered with a pipe during the pipe forming process by extrusion molding, for example, and clamped by suction of the internal air before cooling while sealing the opening of the pipe by welding. This method greatly reduces the cost and can seal by molding, for example, relatively fragile parts (glass pipes, bare chips, etc.) which cannot be inserted in the normal insert molding.

The insert molding which belongs to the injection molding high in productivity is generally used to produce a functional part (such as a sensor or a valve part). For insertion of an electric coil or an IC, some waterproof structure is required for a molded part making up the part housing. For this purpose, the heatpin-draw molding technique disclosed in Japanese Unexamined Patent Publication No. 9-38982 or the mold/welding method disclosed in Japanese Unexamined Patent Publications No. 14-200643, for example, is used to impart waterproofness to the internal insert part.

In the injection molding, in order to inject the molten resin into the die in the injection process and hold the shape accuracy by compensating for the volume reduction due to the phase change in the resin solidification process, a high pressure is imparted to the resin in the die in the dwelling process. This poses the problem that a high-strength die is required and fragile parts cannot be inserted.

To cope with this problem, U.S. Pat. No. 3,979,301 discloses an insert molding method in which the insert is held in an extruded pipe and shaped by air suction or clamp to eliminate the need of the high pressure required in the conventional injection molding, thereby making it possible to shape the fragile insert and reduce the cost due to the reduced rigidity of the die.

This insert molding method is explained. The processes for carrying out this insert molding method include (1) the positioning process, (2) the arrangement process and (3) the shaping process.

First, as shown in FIG. 18, a die 1 is prepared, and with the die 1 open, the positioning process is executed by setting an insert part 2 is set at a predetermined position in the die 1 (FIG. 19).

In this case, the die 1 includes a pair of die pieces, each having a forming surface 1a corresponding to the outer shape of the insert part 2. A die 3 is added to the die 1. The die 3 has a shaping portion 4 of a predetermined shape constituting a path of a molten resin material m having a pipe-shaped cross section to extrude the molten resin material m in the die 1.

Further, a heater 5 constituting a welding means is arranged at a predetermined position of the die 1.

The insert molded part 2 is supported on a support unit 6 at a predetermined portion not covered or shaped by the molten resin material m, and set in position as predetermined in the die 1 by a robot or the like having the support portion 6 (FIG. 19).

Next, after positioning the insert part 2, as shown in FIG. 20, the arrangement process is executed in which the molten resin material m is extruded into the die 1 from the die 3 with the die 1 open while at the same time arranging the insert part 2 in the internal space of the molten resin material m.

The molten resin material m extruded from the die 3 has a pipe-shaped cross section due to the shape of the die 3, and has an open forward end portion extruded from the die 3. In the process, the insert part 2 is fixed at a position in the internal space of the molten resin material m having the pipe-shaped cross section, and therefore, the insert part 2 is inserted into the internal space from the open side of the molten resin material m by the extrusion of the molten resin material m.

Then, the shaping process is executed in which the die 1 is clamped on the molten resin material m with the insert part 2 arranged in the space thereof, so that the molten resin material m shown in FIG. 21 is covered and shaped on the insert part 2.

The die 1 has a forming surface 1a corresponding to the outer shape of the insert part 2 as a surface in contact with the molten resin material m, and therefore, the molten resin material m is deformed into the shape corresponding to the forming surface 1a of the die 1 by clamping while the air in the internal space is discharged from the open side (FIG. 22).

According to the insert molding method described above, the molten resin material m is shaped by the die 1 having the forming surface 1a corresponding to the outer shape of the insert part 2, and therefore, the dimensional accuracy of the insert mold 7 formed is considered to be improved (FIG. 23).

In the conventional method described above, however, as shown in FIG. 24, the gap between the molten resin material m extruded in the shape of pipe and the insert holding die 1 cannot be reduced to zero, so that the air leaks from the gap G (FIG. 25) at the time of air suction (FIG. 26), thereby posing the problem of a reduced shaping efficiency or a reduced air suction efficiency, resulting in a lower productivity. The air leakage reduces the pipe temperature, thereby posing another problem of a reduced welding efficiency due to the heat press at the time of clamping. Still another problem is that in spite of the fact that the pipe shaping stability is improved generally by the continuous extrusion in the extrusion molding, the conventional structure requires the intermittent extrusion, resulting in a lower shape stability and a lower productivity.

SUMMARY OF THE INVENTION

This invention has been proposed to overcome the problems described above, and it is an object of this invention to provide an insert molding die, an insert molding apparatus and an insert molding method in which even a fragile part can be molded using an inexpensive die of low strength with an improved air suction efficiency for shaping, an improved welding efficiency, an improved pipe shape stability and a high productivity.

In order to achieve the object described above, according to a first aspect of the invention, there is provided an insert molding die comprising first and second dies (10a, 10b) arranged to clamp a molded part (11) to be insert molded, wherein the first and second dies (10a, 10b) are separated from each other to permit independent clamping operation.

In this aspect of the invention, the pipe-shaped molten resin material (m) immediately after extrusion can be pressed against an insert molded part (2) before temperature decrease for an improved welding efficiency. The clamping operation positively seals the pipe opening and prevents air leakage for improved air suction efficiency.

According to a second aspect of the invention, there is provided an insert molding apparatus comprising a molding die (10), an extrusion die (12) for sending the molten resin material (m) toward the clamping surface of the molding die (10) and a support unit (20) for supporting the insert part (2) in position on the molded part (11) to be insert molded at the position where the molten resin material (m) is extruded by the extrusion die (12), wherein the molding die (10) includes first and second dies (10a, 10b) arranged to permit the clamping of the molded part (11), and wherein the first and second dies (10a, 10b) are separated from each other to permit independent clamping operation.

In this aspect of the invention, due to the clamping operation performed with a part of the separated dies, the high-temperature pipe-shaped molten resin material (m) immediately after extrusion can be pressed against the insert part (2) before temperature decrease for an improved welding efficiency. The clamping operation positively seals the pipe opening and prevents the air leakage for improved air suction efficiency.

According to a third aspect of the invention, there is provided an insert molding apparatus comprising an extruder (21) for sending the molten resin material (m) to the extrusion die (12) and a ejecting unit (22) to eject the molded part (11) after clamping, wherein the first and second dies (10a, 10b) of the molding die (10) include a cavity (C) formed on the clamping surface of a part of the separated dies as a buffer portion (b) filled with the molten resin material (m) extruded through the extrusion die (12) from the extruder (21).

In this aspect of the invention, the buffer portion (b) is formed by filling the molten resin material (m) in the cavity (C), and therefore, the molten resin material (m) can be extruded continuously. The buffer portion (b) functions also as a holding portion for ejecting the molded part.

According to a fourth aspect of the invention, there is provided an insert molding apparatus, wherein the molding die (10) and the support portion (20) can be relatively moved between the position where the molten resin material (m) is extruded against the insert part (2) by the extrusion die (12) and the position where the molded part (11) after clamping by the molding die (10) is cooled and ejected.

In this aspect of the invention, the molten resin material (m) is extruded against the insert part (2) while at the same time cooling and ejecting the molded part (11) after clamping, so that the next insert molding can be carried out continuously.

According to a fifth aspect of the invention, there is provided an insert molding apparatus, wherein the molding die (10) can be reciprocated between the position where the molded part (11) after clamping by the molding die (10) is cooled and ejected and the position where the molten resin material (m) is extruded against the insert part (2) by the extrusion die (12).

In this aspect of the invention, while the molded part (11) after clamping by the molding die (10) is cooled and ejected, the molten resin material (m) can be extruded against the next insert part (2) at the position where the molten resin material (m) is extruded against the present insert part (2) by the extrusion die (12), thereby making possible the continuous molding process.

According to a sixth aspect of the invention, there is provided an insert molding method, wherein the insert part (2) is supported in the molten resin material (m) extruded in the shape of pipe while the air is sucked, and the first and second dies (10a, 10b) separated from each other to permit independent clamping operation are used for shaping;

wherein the molten resin material (m) extruded in the shape of pipe is clamped by a part of separated dies included in the first and second dies (10a, 10b), and the molten resin material (m) is pressed against the neighborhood of the support side of the insert part (2) thereby to seal the forward end opening of the molten resin material (m);

wherein the air is then sucked while at the same time performing the clamping operation with another separated die included in the first and second dies (10a, 10b) thereby to cover and shape the molten resin material (m) around the insert part (2); and wherein the clamping operation is performed by a separated die in standby state included in the first and second dies (10a, 10b) so that the molten resin material (m) extruded in the shape of pipe is cut off thereby to eject the molded part (11) covered with the molten resin material (m).

In this aspect of the invention, the gap between the molten resin material (m) extruded in the shape of pipe from the extrusion die (12) and the molding die (1) is eliminated thereby to prevent the air leakage at the time of air suction.

The temperature reduction of the molten resin material (m) which otherwise might be caused by the air leakage, can be prevented, and therefore the welding efficiency is prevented from decreasing due to the heat press at the time of clamping.

According to a seventh aspect of the invention, there is provided an insert molding method carried out by an insert molding apparatus (S) having a molding die (10) reciprocable between the position where the molded part (11) after clamping by the molding die (10) is cooled and ejected and the position where the molten resin material (m) is extruded against the insert part (2) by the extrusion die (12), wherein the molten resin material (m) is extruded against the insert part (2) at the position where the molten resin material (m) is to be extruded against the insert part (2) on the one hand, while the molded part (11) after clamping by the molding die (10) is cooled and ejected at the position where the molded part (11) after clamping by the molding die (10) is to be cooled and ejected on the other hand;

wherein the molding die (10) is then brought to the position where the molten resin material (m) is extruded against the insert part (2), followed by clamping the molding die (10) at the particular extruding position through the extruded molten resin material (m), and the molding die (10) thus clamped is brought to the position where the molded part (11) is cooled and ejected on the one hand, while the insert part (2) next to be insert molded is supported at the position where the molten resin material (m) is extruded in the shape of pipe against the insert part (2) on the other hand.

In this aspect of the invention, the pipe-shaped molten resin material (m) is extruded against the insert part (2) before extrusion molding on the one hand while the molded part (11) after clamping by the molding die (10) can be cooled and ejected on the other hand.

Then, the molding die (10) is brought to the position of extrusion of the molten resin material (m) and clamped through the extruded molten resin material (m). The molding die (10) thus clamped is brought to the position where the molded part (11) after clamping is cooled and ejected.

In the process, at the position of extrusion of the molten resin material (m), the insert part (2) next to be insert molded is set in position and supported and the molten resin material (m) is extruded in the shape of pipe against the insert part (2).

By repeating the process described above, the extrusion molding can be carried out continuously.

Incidentally, the reference numerals in the parentheses designating the respective means represent an example of correspondence with the specific means described later with embodiments.

The present invention may be more fully understood from the description of preferred embodiments of the invention, as set forth below, together with the accompanying drawings.

DESCRIPTION OF THE PREFERRED EMBODIMENTS

Figure 1:
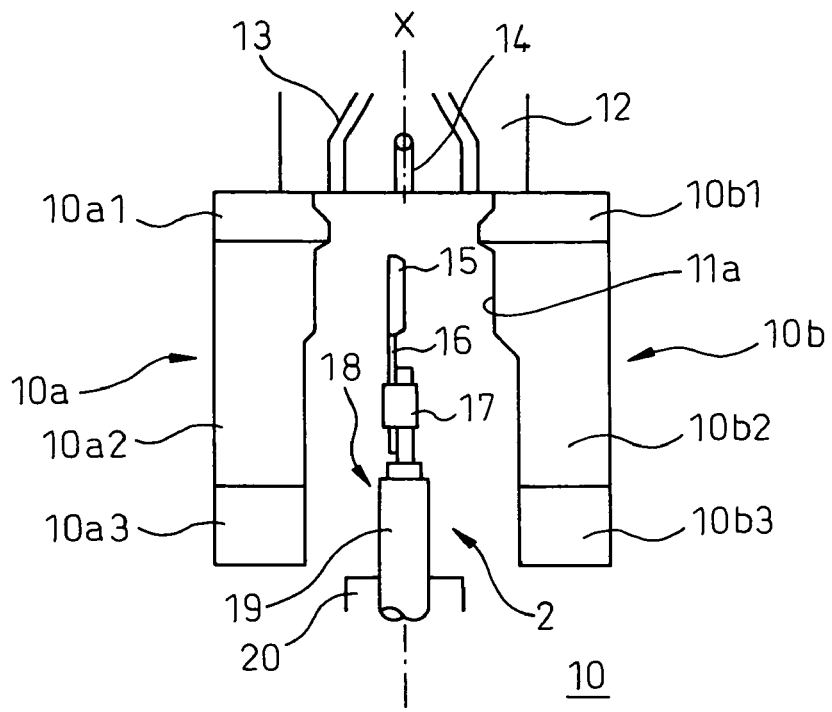
FIG. 1 is a schematic sectional view for explaining an example of the insert molding die according to this invention in which the die is open and the insert part arranged.
Figure 2:
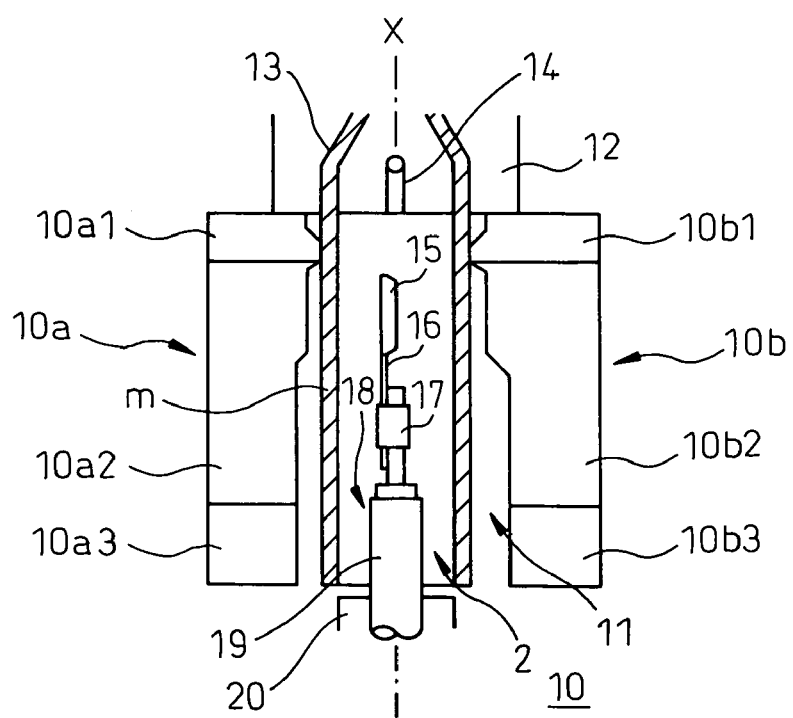
FIG. 2 is a schematic sectional view explaining the state in which the molten resin material is extruded in the shape of pipe in the insert molding die shown in FIG. 1.

An insert molding die 10 is shown in FIG. 1.

The insert molding die 10 includes a pair of dies 10a, 10b arranged in such a position as to clamp, from the direction of axis X, an insert part 2 arranged along the axis X to be insert molded. The inner clamping surface of each of the dies 10a, 10b has a forming surface 11a corresponding to the outer shape of an inserted molded part 11.

The dies 10a, 10b include first separated dies 10a1, 10b1, second separated dies 10a2, 10b2 and third separated dies 10a3, 10b3 separate from each other to permit the independent clamping operation.

The insert molding die 10 also includes an extrusion die 12 for extruding the molten resin material m against the clamping surfaces in position along the upper axis X of the insert molding die 10. The molten resin material m is sent into the extrusion die 12 from the extruder (described later) of the insert molding apparatus.

The extrusion die 12 is formed with a shaping portion 13 constituting a path for extruding the molten resin material m in the shape of pipe against the clamping surfaces of the insert molding die 10. Further, the extrusion die 12 has an suction path 14 directed toward the clamping surfaces of the insert molding die 10 along the axis X.

Incidentally, the molten resin material m may be formed of a well-known thermoplastic resin adapted for extrusion molding.

The insert part 2 to be insert molded in the case under consideration is a part configured of a lead 16 with an IC chip 15 mounted thereon and a cable 18 electrically connected to the lead 16 at the connector 17 by welding or thermal caulking.

In this case, the portion of the cable 18 other than the connector 17 with the lead 16 is covered by a coating member 19 of a resin material such as thermoplastic elastomer (TPEE).

The portion of the insert part 2 described above not covered or shaped by the molten resin material m is supported on the support portion 20 of a robot or the like (not shown) and set in position on the axis X of the molding die 10 by the robot or the like.

Next, the insert molding process executed using the insert molding die 10 of the insert molding apparatus having the above-mentioned configuration is explained.

First, the insert molding die 10 is opened by separating the pair of the dies 10a, 10b from each other about the axis X. At the same time, the robot or the like holding the insert part 2 through the support portion 20 is moved and set in position on the axis X of the insert molding die 10 (FIG. 1).

Next, the molten resin material m is extruded in the shape of pipe from the extruder of the insert molding apparatus through the shaping portion 13 of the extrusion die 12 above the molding die 10. As a result, the molten resin material m is extended in the shape of pipe having equal diameter to the neighborhood of the support portion 20 around the insert part 2.

Figure 3:
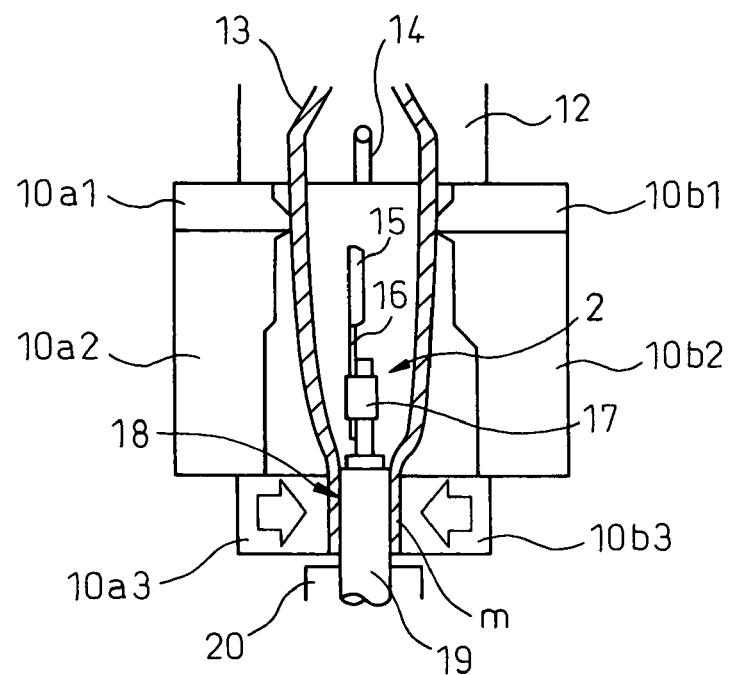
FIG. 3 is a schematic sectional view explaining the state in which the clamping operation is performed by moving a first separated die from the state shown in FIG. 2 and one open end of the pipe-shaped molten resin material is thermally welded.

Once the molten resin material m is extruded in the shape of pipe, the clamping operation is performed by the third separated dies 10a3, 10b3 of the insert molding die 10 (FIG. 3). The third separated dies 10a3, 10b3 are located on the side of that portion of the insert part 2 set in position on the axis X of the insert molding die 10 which is on the side of the cable 18 in the neighborhood of the support portion 20. Therefore, the third separated dies 10a3, 10b3 are just after extrusion and high in temperature. Thus, the pipe-shaped molten resin material m can be pressed against the cable 18 with a high welding efficiency. The clamping operation positively seals the forward end of the opening of the pipe-shaped molten resin material m. Thus, no air leaks for a higher air suction efficiency.

Figure 4:
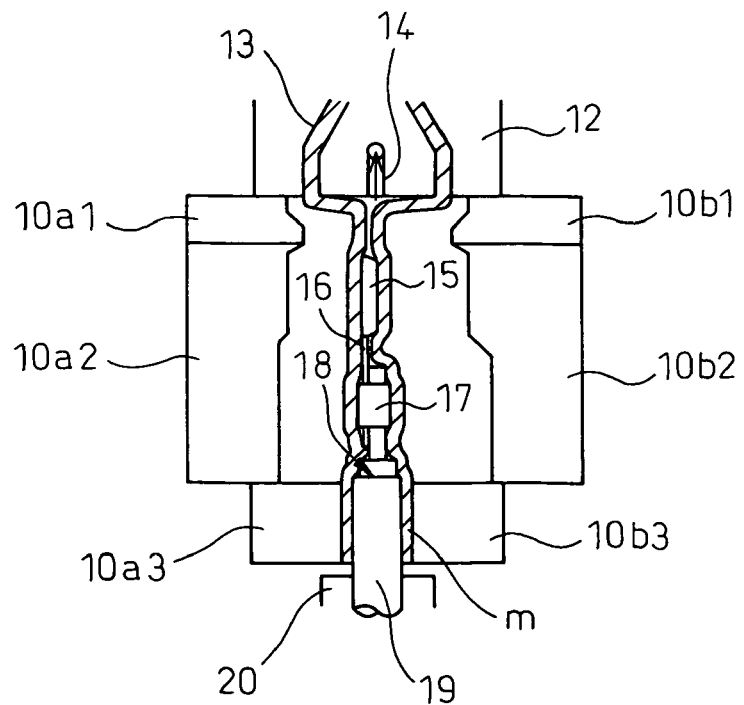
FIG. 4 is a schematic sectional view explaining the state in which the air is sucked from the state shown in FIG. 3.
Figure 5:
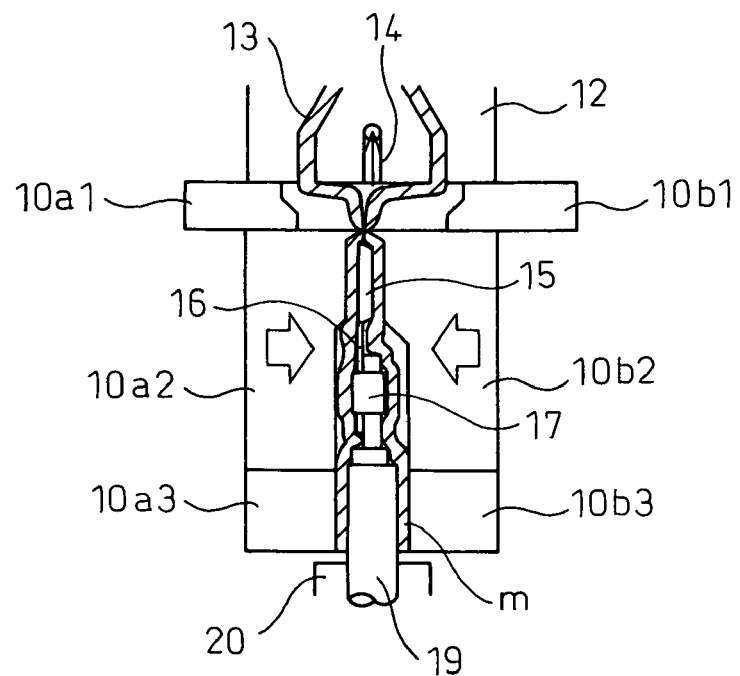
FIG. 5 is a schematic sectional view explaining the state in which the clamping operation is performed by moving a second separated die.

Next, as shown in FIG. 4, the clamping operation is performed by the second separated dies 10a2, 10b2 of the insert molding die 10 at the same time as or after the air suction through the suction path 14 of the extrusion die 12 (FIG. 5). As a result, the molten resin material m is shaped in such a manner as to cover the periphery of the connector 17, the lead 16 and the IC chip 15 located above the cable 18 of the insert part 2. In the process, the open end of the pipe-shaped molten resin material m corresponding to the IC chip 15 of the insert part 2 is sealed and welded by clamping.

Figure 6:
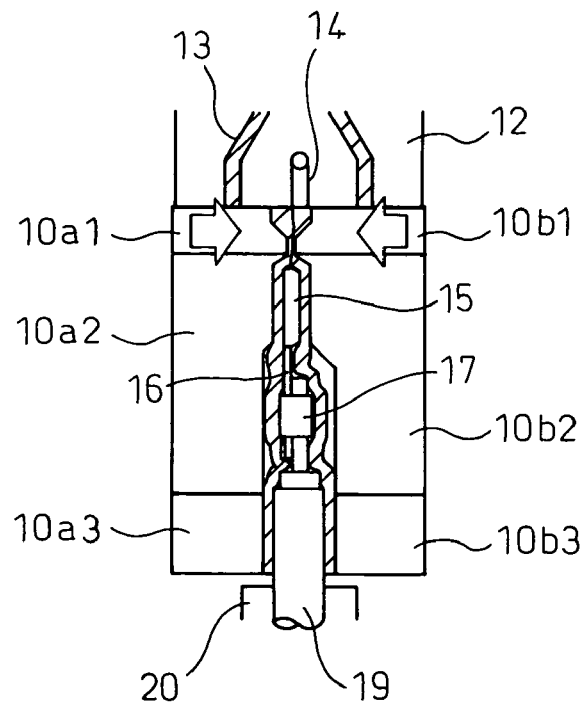
FIG. 6 is a schematic sectional view explaining the state in which the clamping operation is performed by moving a first separated die.
Figure 7:
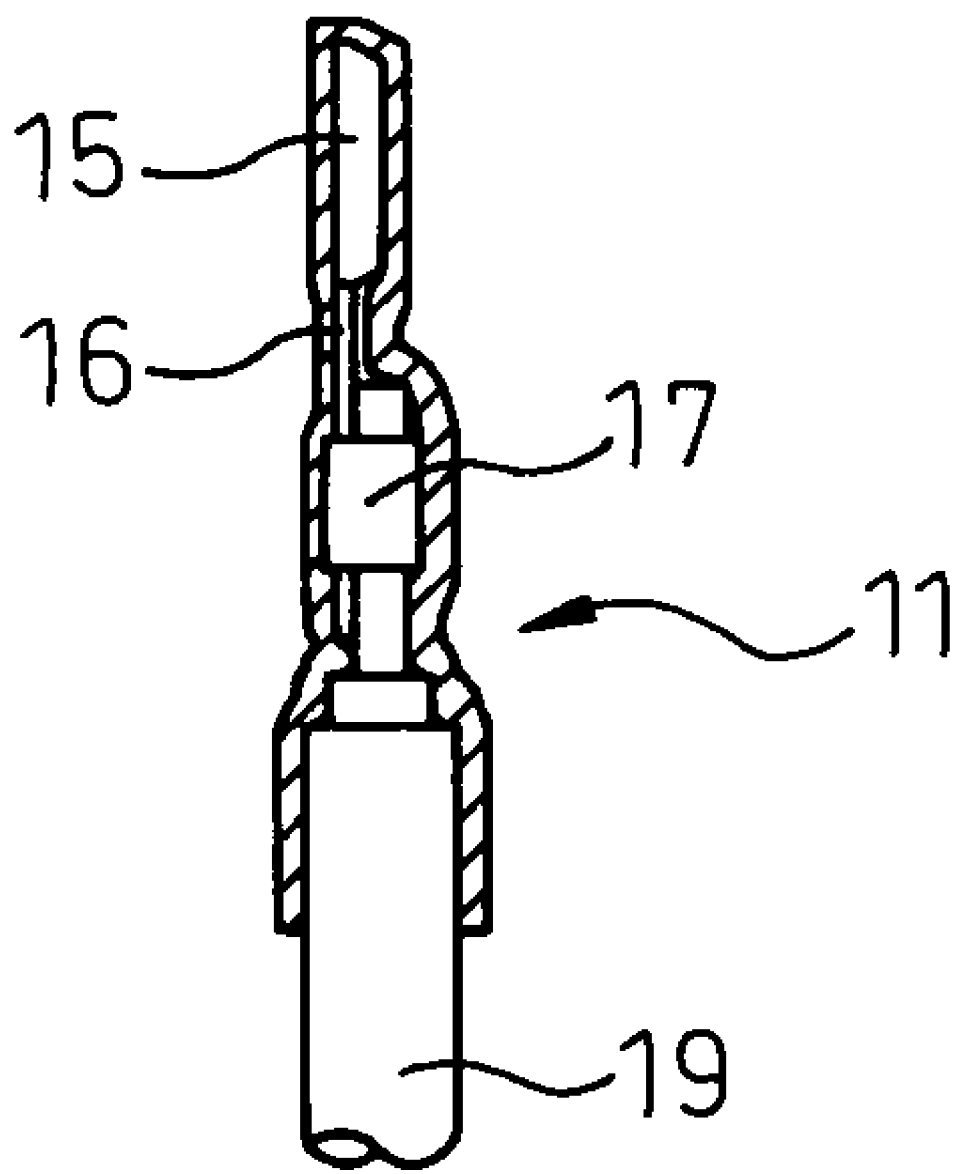
FIG. 7 is a schematic sectional view explaining the insert molded part ejected by opening the die from the state shown in FIG. 6.

As shown in FIG. 6, the clamping operation of the first separated dies 10a1, 10b1 of the insert molding die 10 cuts off the pipe-shaped molten resin material m from the extrusion die 12. Thus, the insert molding die 10 is opened, the robot is driven, and the support portion 20 is moved from the axis X of the molding die 10, so that the insert molded part 11 can be ejected (FIG. 7) to enter the standby state for the molding process of the next insert part 2 to be insert molded.

By carrying out the insert molding using the insert molding die 10 in the manner described above, the gap between the pipe-shaped molten resin material m extruded from the extrusion die 12 and the insert molding die 10 is eliminated to prevent the air leakage at the time of air suction. As a result, the shaping efficiency is not reduced and the reduction in productivity which otherwise occur due to the reduced air suction efficiency is avoided.

The temperature drop of the pipe-shaped molten resin material m which otherwise might be caused by the air leakage is prevented, and therefore, the reduction in welding efficiency due to the heat press at the time of clamping can be suppressed.

Figure 8:
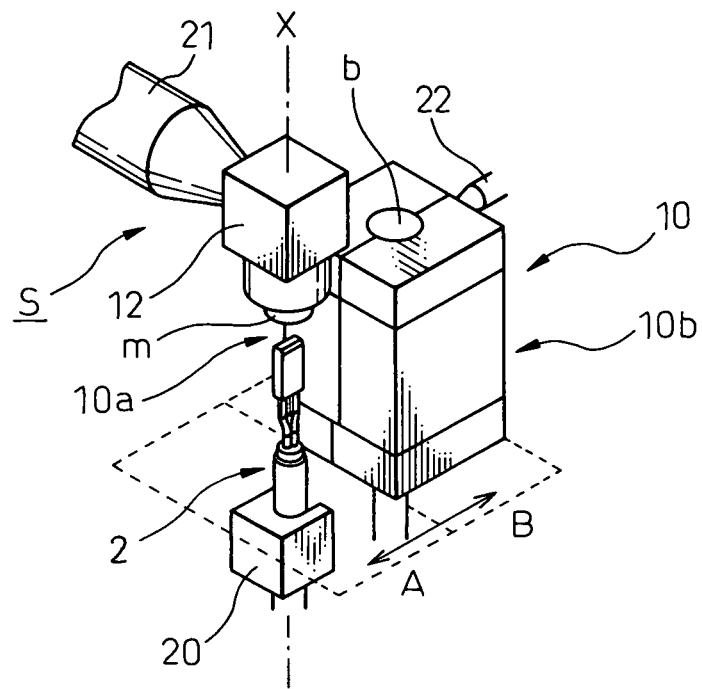
FIG. 8 is a perspective view explaining the essential parts of the insert molding apparatus in which the insert part is set in position and the cooling process is executed for continuous insert molding.

Further, the use of the insert molding apparatus S shown in FIG. 8 having the above-mentioned insert molding die 10 mounted thereon makes possible the continuous extrusion molding.

The insert molding apparatus S used in this embodiment will be explained.

The insert molding apparatus S is so configured that the insert molding die 10 can be reciprocated in the direction perpendicular to the axis X between stations A and B by a mechanism not shown.

The insert molding apparatus S includes an extruder 21 for sending the molten resin material m to the extrusion die 12 and a ejecting unit 22 to eject the insert molded part 11 after clamping.

Further, the first separated dies 10a1, 10b1 of the insert molding die 10 include a cavity C formed on the clamping surface thereof which constitutes a buffer portion b when filled with the molten resin material m extruded through the extrusion die 12 from the extruder 21.

Next, the continuous molding process by the insert molding apparatus S is explained.

In the insert molding apparatus S described above, as shown in FIG. 8, the insert molded part 11 clamped as in the immediately preceding finishing stage thereof is cooled in station B on the one hand, while the insert part 2 next to be insert molded is supported on the support portion 20 of the robot or the like along the X axis in station A at the same time.

Figure 9:
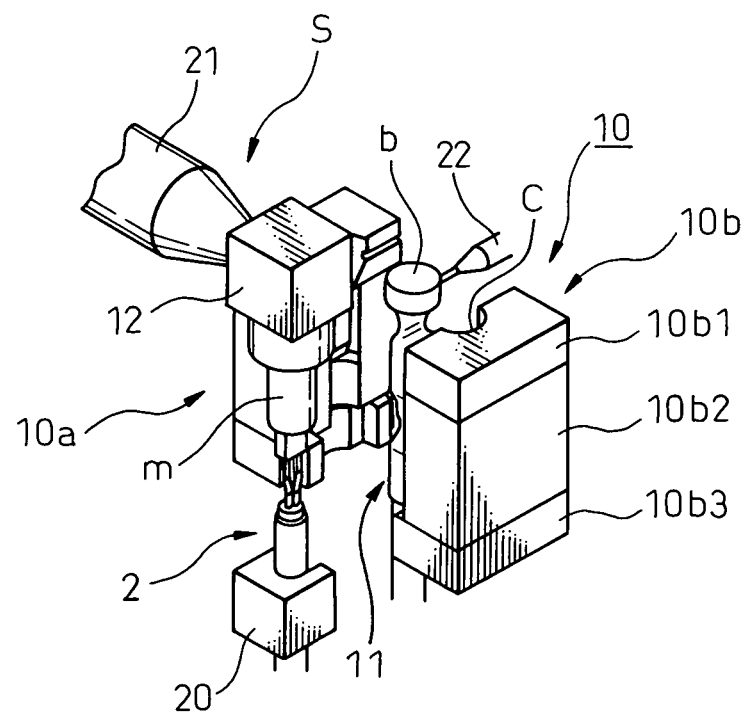
FIG. 9 is a perspective view explaining the essential parts of the insert molding apparatus and the molten resin material in which the die is open for continuous insert molding.
Figure 10:
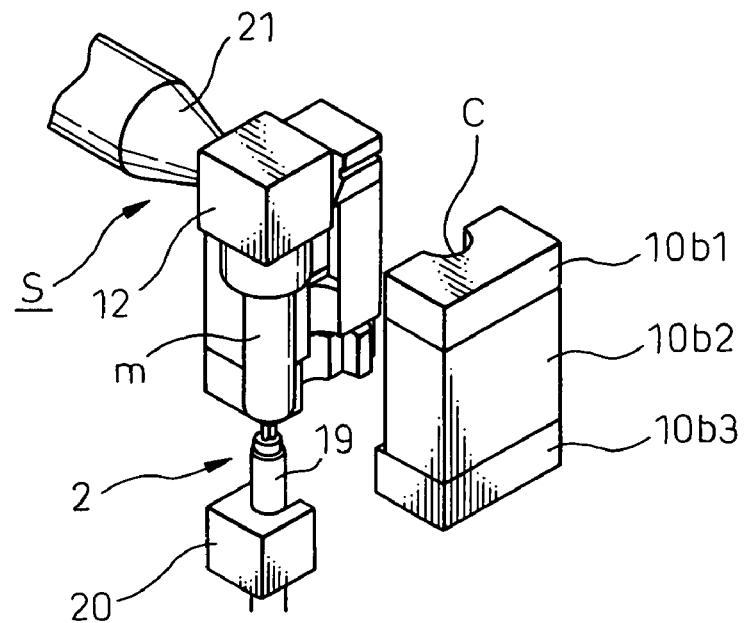
FIG. 10 is a perspective view explaining the essential parts in which the molten resin material is extruded in the shape of pipe and the insert molded part is ejected.

Next, in FIG. 9, as soon as the insert molding die 10 located in station B is opened, the insert molded part 11 after shaping can be ejected by the ejecting unit 22 (FIG. 10). The inserted molded part 11 can be easily ejected with the support of the buffer portion b formed by filling the cavity C of the first separated dies 10a1, 10b1.

In station A, on the other hand, the molten resin material m is extruded in the shape of pipe against the insert part 2 supported along the axis X by the support portion 20 of the robot or the like through the shaping portion 13 of the extrusion die 12 from the extruder 21. As a result, the molten resin material m can be extruded in the shape of pipe uniform in diameter to the neighborhood of the support portion 20 around the insert part 2.

Figure 11:
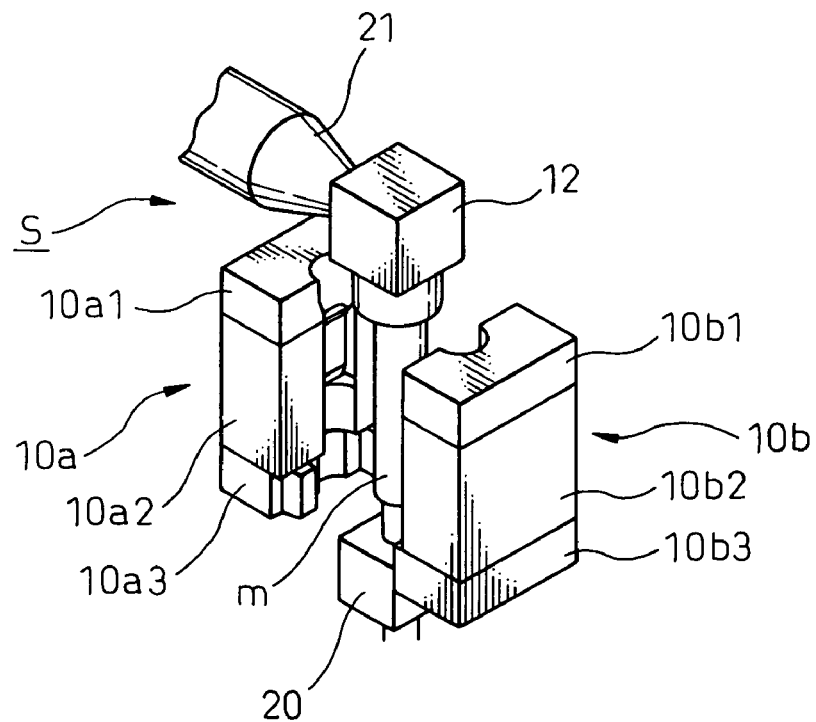
FIG. 11 is a perspective view explaining the essential parts in which the molten resin material is extruded in the shape of pipe while the molding die is moved.

In station B, on the other hand, the insert molded part 11 appropriately processed is ejected from the open molding die 10, while the insert molding die 10 is moved in the direction perpendicular to the axis X, i.e. toward station B. Meantime, in station A, the molten resin material m continues to be extruded to the neighborhood of the support portion 20 around the insert part 2, soon followed by the end of the extrusion process (FIG. 11).

Figure 12:
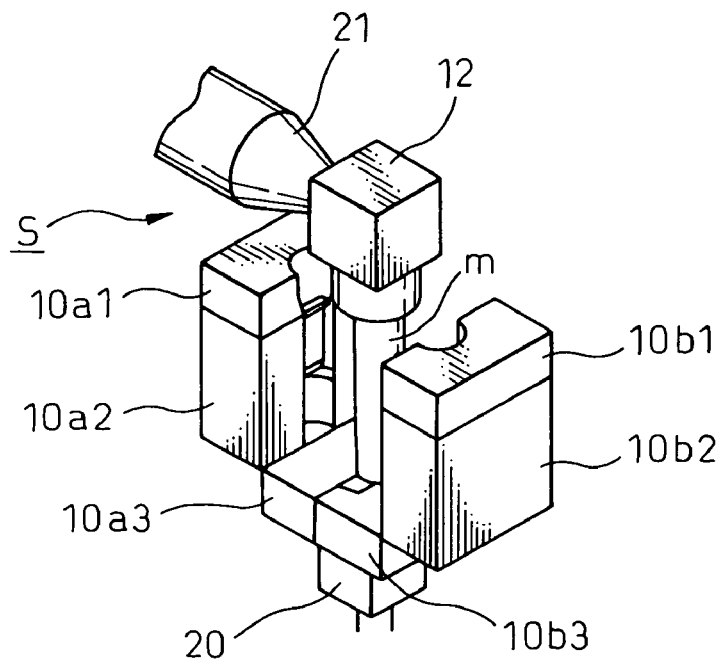
FIG. 12 is a perspective view explaining the essential parts in which the molding die is clamped by a third separated die.
Figure 13:
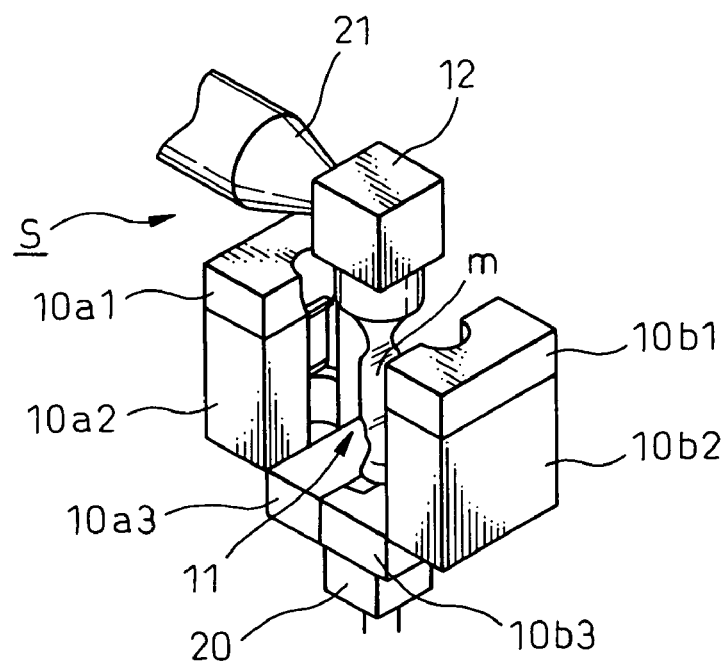
FIG. 13 is a perspective view explaining the essential parts in which the air suction process is executed in the state shown in FIG. 12.
Figure 14:
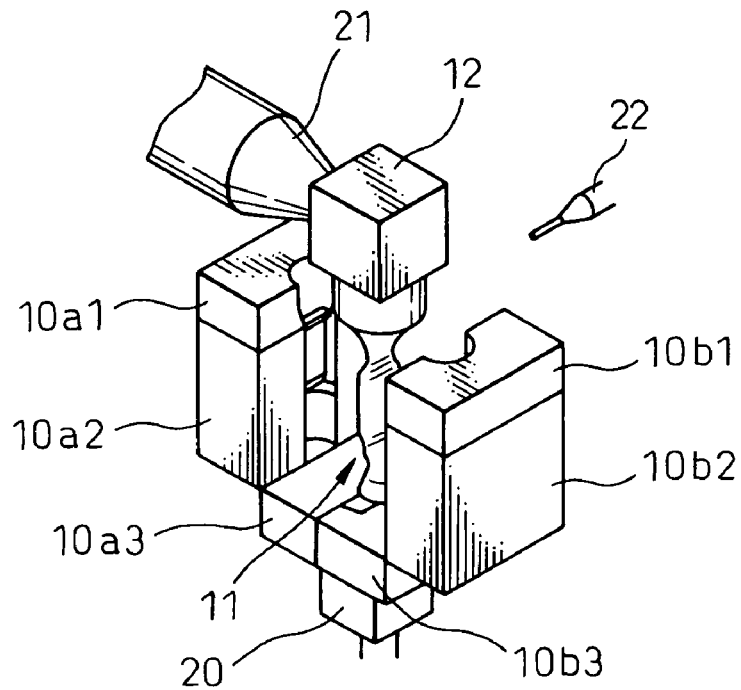
FIG. 14 is a perspective view explaining the essential parts in which the ejecting unit is restored in the state shown in FIG. 13.

Once the molten resin material m reaches the cable 18 in the neighborhood of the support portion 20 by the extrusion process, the clamping operation is performed by the third separated dies 10a3, 10b3 of the insert molding die 10 (FIG. 12). As the result of this clamping operation, the high-temperature molten resin material m just extruded is pressed against the cable 18 before temperature drop. Therefore, the forward end opening of the pipe-shaped molten resin material m is positively sealed. Thus, the air suction efficiency is improved without air leakage, with the result that the air suction can be positively carried out (FIGS. 13, 14).

Figure 15:
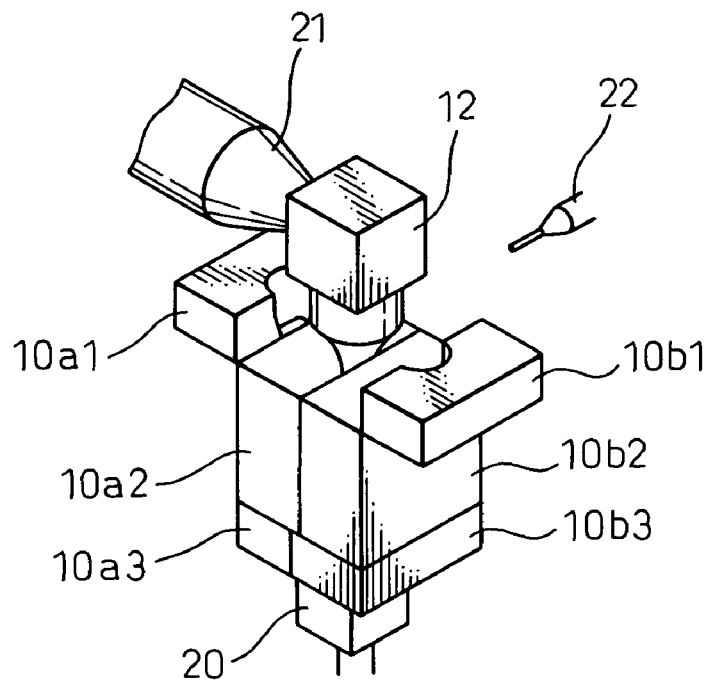
FIG. 15 is a perspective view explaining the essential parts in which the clamping operation is performed by a second separated die in the state shown in FIG. 14.

At the same time as the air suction in station A, the ejecting unit 22 is restored to the ejecting position and enters the standby state in station B. Then, the clamping operation is performed by the second separated dies 10a2, 10b2 of the insert molding die 10 (FIG. 15).

Figure 16:
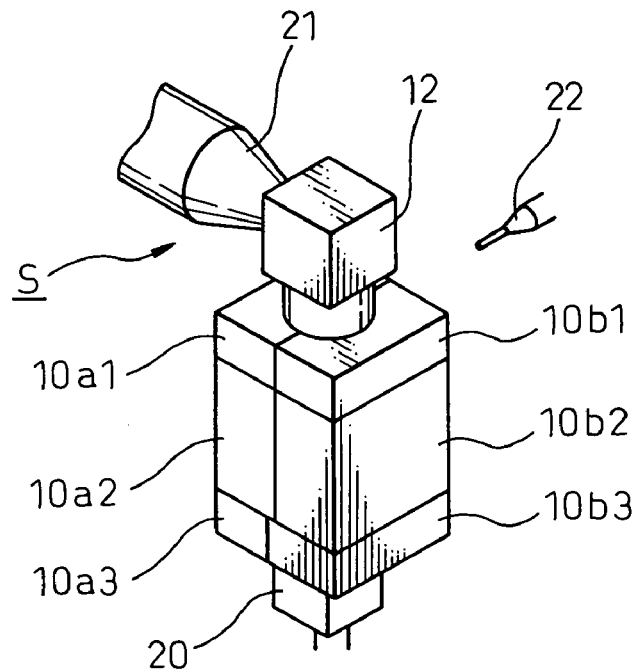
FIG. 16 is a perspective view explaining the essential parts in which the clamping operation is performed by a first separated die in the state shown in FIG. 15.
Figure 17:
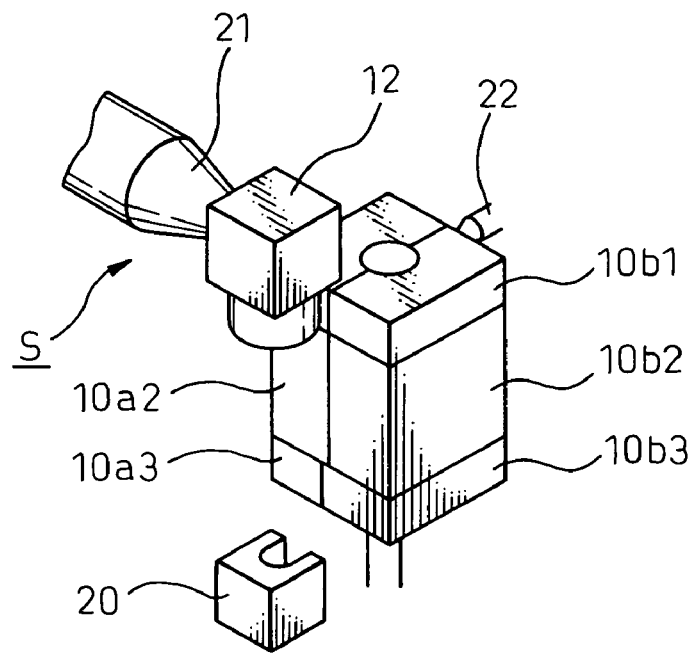
FIG. 17 is a perspective view explaining the essential parts in which the molding die is moved from the state shown in FIG. 16.
Figure 18:
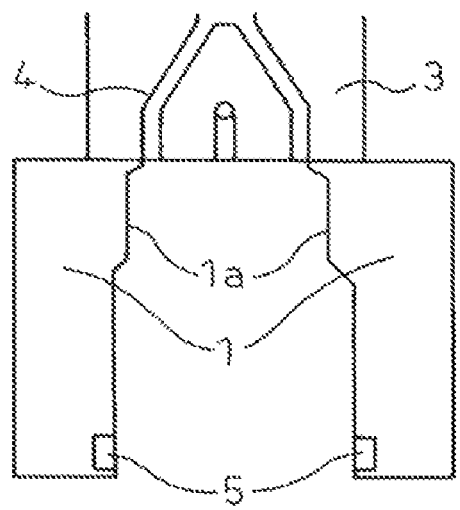
FIG. 18 is a schematic sectional view explaining the configuration of an example of the conventional die in the state where the die is open.
Figure 19:
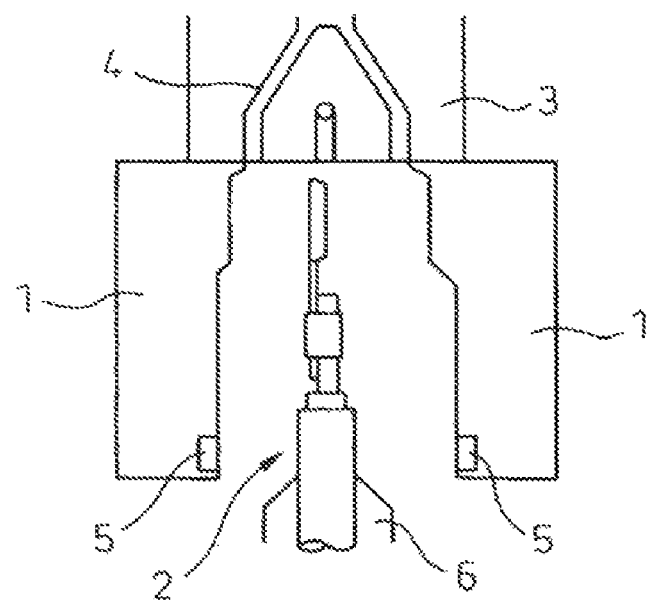
FIG. 19 is a schematic sectional view explaining the state in which the insert part to be insert molded is arranged in the state shown in FIG. 18.
Figure 20:
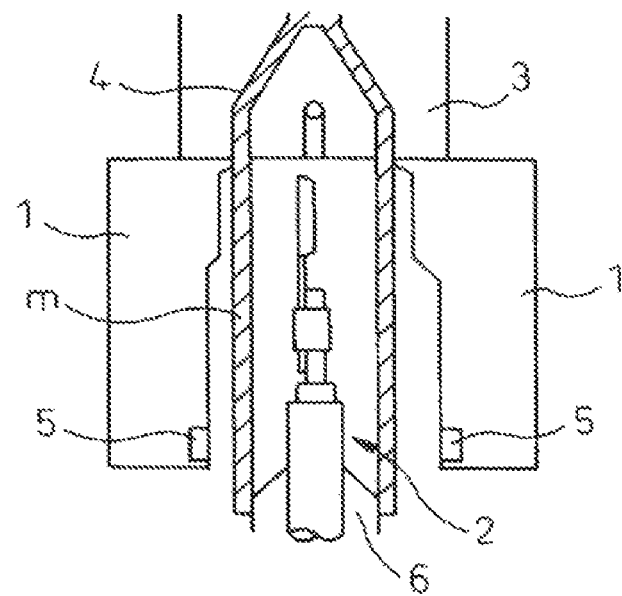
FIG. 20 is a schematic sectional view explaining the state in which the molten resin material is extruded in the shape of pipe against the insert part.
Figure 21:
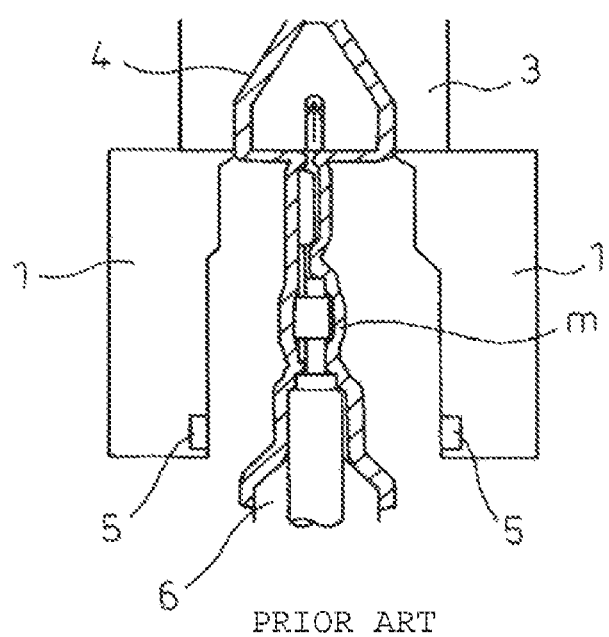
FIG. 21 is a schematic sectional view explaining the air suction in the state shown in FIG. 20.
Figure 22:
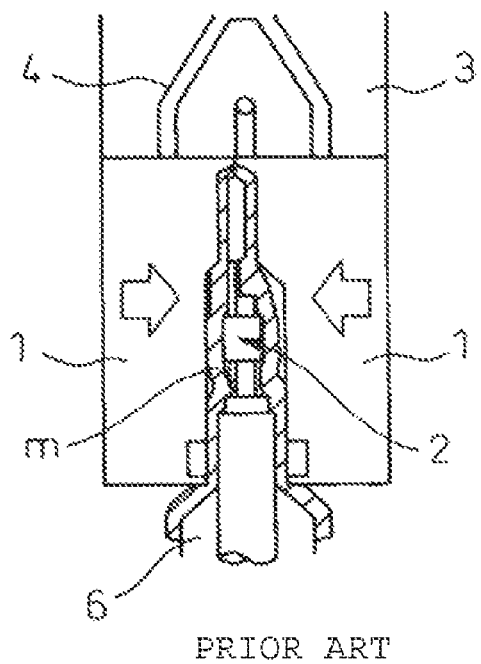
FIG. 22 is a schematic sectional view explaining the sate in which the cable is welded by clamping.
Figure 23:
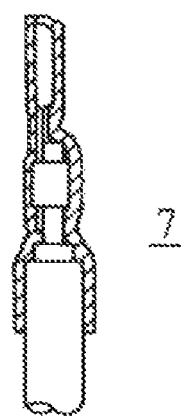
FIG. 23 is a schematic sectional view showing the insert molded part ejected after the die is opened from the state shown in FIG. 22.
Figure 24:
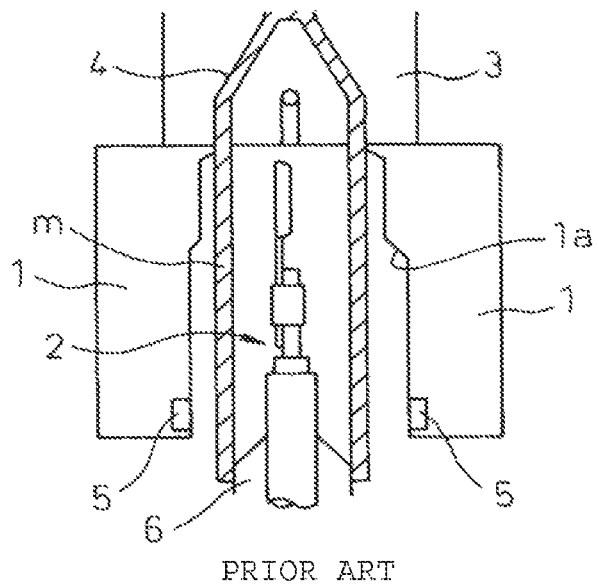
FIG. 24 is a schematic sectional view explaining the inconveniences of the insert molding using the conventional molding die.
Figure 25:
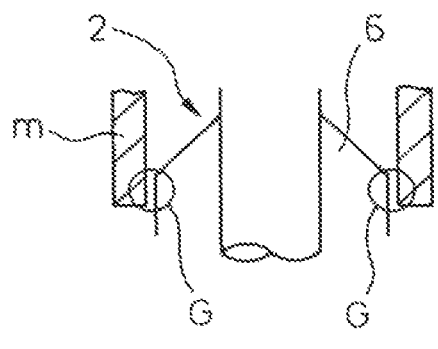
FIG. 25 is a schematic sectional view explaining the inconveniences of the insert molding using the conventional molding die.
Figure 26:
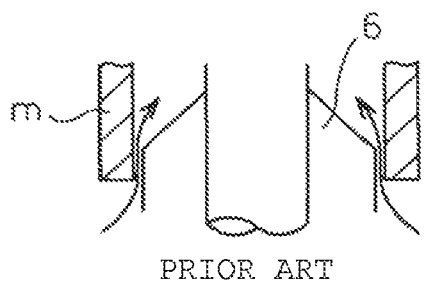
FIG. 26 is a schematic sectional view explaining the inconveniences of the insert molding using the conventional molding die.

Immediately after that, the clamping operation is performed by the first separated dies 10a1, 10b1 of the molding die 10, so that the pipe-shaped molten resin material m is cut off from the extrusion die 12 (FIG. 16). Thus, the insert molding die 10 holding the insert molded part 11 is moved to station B.

The movement of the molding die 10 to station B makes it possible to insert the extruder 22 into the insert molded part 11 in the molding die 10. In station A, on the other hand, the insert part 2 to be molded in the next molding process is ready to be received.

As described above, the insert molding apparatus S is so configured that the molding die 10 can be reciprocated between stations A and B, and while the molten resin material m is extruded in the shape of pipe against the insert part 2 before extrusion molding on the one hand, the cooling and ejecting operation in the molding die 10 can be performed so that the molding die 10 is returned to the extrusion position of the molten resin material m to carry out the clamping and air suction at the same time, thus making it possible to continuously carry out the extrusion molding.

In this way, the continuous extrusion molding of the insert part 2 is made possible and a high productivity realized without adversely affecting the shaping stability.

An example of the molding process using the insert molding die 10 is describe above. Nevertheless, the structure of the molding die 10 is not limited to the first to third separated dies 10a1, 10b1, 10a2, 10b2, 10a3, 10b3. In other words, the molding die may alternatively be separated into two or four dies depending on the shape of the object to be shaped.

In addition to the configuration in which the molding die 10 can be reciprocated between stations A and B, a configuration is also conceivable in which the molding die 10 is moved in the direction of extrusion (along the axis X) in synchronism with the extrusion rate. In the latter case, another die is arranged upstream of the first separated dies 10a1, 10b1 to cut off the pipe-shaped molten resin material m extruded. After cutting off, the die may be moved in the direction opposite to the extrusion.

Further, the insert molding apparatus S has the function of executing the molding process with the molding die 10 and the extrusion die 12 moved relatively to each other. Therefore, a configuration is possible in which the extrusion die 12 instead of the molding die 10 is moved.

While the invention has been described by reference to specific embodiments chosen for purpose of illustration, it should be apparent, to those skilled in the art, that numerous modifications could be made thereto without departing from the basic concept and scope of the invention.

The invention claimed is:

1. An insert molding method:
   wherein an insert part is supported in the molten resin material extruded in the shape of pipe by an extrusion die, and while sucking the air, the molten resin material with the insert part is shaped by at least a top set of die halves closest to the extrusion die, a middle set of die halves, and a bottom set of die halves furthest from the extrusion die, the top, middle and bottom sets of die halves being separable from each other to permit independent clamping by each of the top, middle and bottom sets of die halves;
   wherein the molten resin material extruded in the shape of pipe is clamped by the bottom set of die halves, and the molten resin material is pressed against the support side of the insert part thereby to seal the open forward end of the molten resin material;
   wherein at the same time as the air is sucked with the open forward end of the molten resin material having been sealed, a clamping operation is performed by the middle set of die halves to cover and shape the molten resin material around the insert part; and
   wherein a clamping operation is performed by the top set of die halves so that the molten resin material extruded in the shape of pipe is cut off thereby to eject the molded part covered with the molten resin material.

2. An insert molding method according to claim 1, further comprising:
   performing extrusion molding using an insert molding apparatus configured to reciprocate between the position where the molded part after clamping by the molding die is cooled and ejected and the position where the molten resin material is extruded against the insert part by the extrusion die,
   wherein the molten resin material is extruded against the insert part at the position where the molten resin material is to be extruded against the insert part, while the molded part after clamping by the molding die is cooled and ejected at the position where the molded part after clamping by the molding die is to be cooled and ejected; and
   wherein the molding die is then brought to the position where the molten resin material is extruded against the insert part, followed by clamping the molding die at the particular extruding position of the extruded molten resin material, and the molding die thus clamped is brought to the position where the molded part is cooled and ejected, while the insert part next to be insert molded is supported at the position where the molten resin material is extruded in the shape of pipe against the insert part.

3. The insert molding method according to claim 1, wherein
   the molten resin material which is extruded in the shape of pipe is pressed against the insert part by the bottom set of die halves while the bottom set of die halves has a raised temperature for creating a weld due to extrusion of the molten resin material.

4. The insert molding method according to claim 1, wherein
   the insert part includes a lead with an IC chip mounted thereon and a cable electrically connected to the lead,
   the molten resin material which is extruded in the shape of pipe is pressed against the cable by the bottom set of die halves while the bottom set of die halves has a raised temperature for creating a weld due to extrusion of the molten resin material.

* * * * *